United States Patent [19]
Wilkinson

[11] Patent Number: 5,974,183
[45] Date of Patent: *Oct. 26, 1999

[54] METHOD FOR VIDEO COMPRESSION USING TEMPORAL WEIGHTING

[75] Inventor: James Hedley Wilkinson, Tadley, United Kingdom

[73] Assignees: Sony Corporation, Tokyo, Japan; Sony United Kingdom Limited, Weybridge, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/658,589

[22] Filed: Jun. 5, 1996

[30] Foreign Application Priority Data

Jun. 6, 1995 [GB] United Kingdom .................... 9511461

[51] Int. Cl.$^6$ ................................ G06K 9/36; G06K 9/46
[52] U.S. Cl. ............................................. 382/236; 382/252
[58] Field of Search ..................... 382/236, 240, 382/232, 238, 252; 348/398, 408, 394, 412, 415; 358/428, 261.2, 430; 345/148, 474, 475

[56] References Cited

U.S. PATENT DOCUMENTS

| | | | |
|---|---|---|---|
| 5,021,882 | 6/1991 | Schreiber | 348/432 |
| 5,107,348 | 4/1992 | Citta et al. | 348/412 |
| 5,150,209 | 9/1992 | Baker et al. | 348/407 |
| 5,309,232 | 5/1994 | Hartung et al. | 348/398 |
| 5,355,378 | 10/1994 | Ohta | 371/53 |
| 5,410,354 | 4/1995 | Uz | 348/409 |
| 5,457,495 | 10/1995 | Hartung | 348/414 |
| 5,659,363 | 8/1997 | Wilkinson | 348/416 |

FOREIGN PATENT DOCUMENTS

| | | | |
|---|---|---|---|
| 0469648 A2 | 2/1992 | European Pat. Off. | H04N 7/133 |
| 0547826 A1 | 6/1993 | European Pat. Off. | H03M 3/04 |
| 0574724 A2 | 12/1993 | European Pat. Off. | H04N 7/13 |
| 7-75062 | 3/1995 | Japan | H04N 5/92 |

OTHER PUBLICATIONS

Wilkinson, Wavelet transforms in a digital video tape recorder (DVTR), Jan. 1993, pp. 1–7.
Wilkinson, Motion video compression at very low bit rates, Jul. 1995, pp. 306–310.
Simon et al., A general sub-band coding scheme for 140 Mbit/s HDTV, pp. 401–404.

*Primary Examiner*—Amelia Au
*Assistant Examiner*—Timothy M. Johnson
*Attorney, Agent, or Firm*—Frommer Lawrence & Haug, LLP.; William S. Frommer

[57] ABSTRACT

Decoder reconstruction error is estimated so as to provide compensation at the encoder which equalizes the errors over different frames, since the errors created by some frames are lower than those created by other frames. The compensation is provided by means of temporal weighting applied in the form of temporal bands each associated with specific numbered frames within a frame group. The technique can be applied to a logarithmic temporal decimation frame structure in which one frame within a group of $2^n$ frames is an 'I' frame and the remaining frames are 'B' frames.

8 Claims, 2 Drawing Sheets

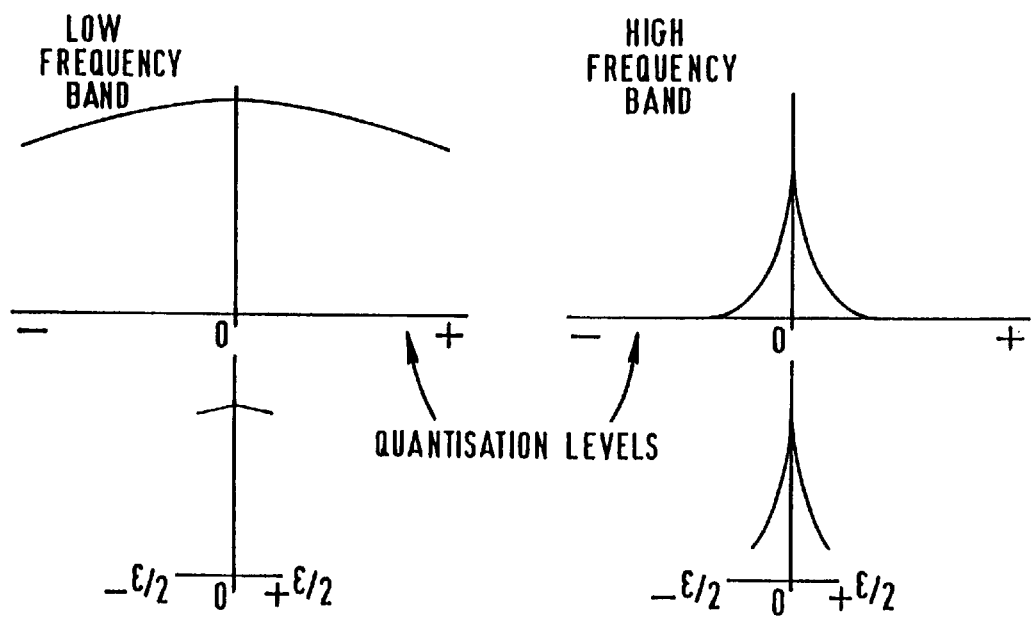
FIG. 3
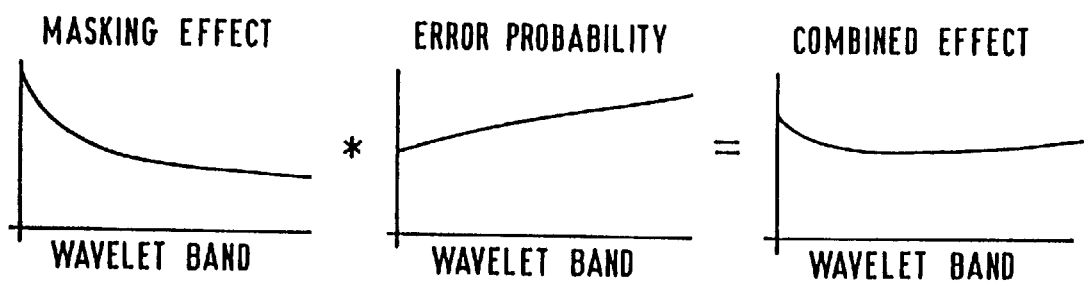
FIG. 4
FIG. 5

METHOD FOR VIDEO COMPRESSION USING TEMPORAL WEIGHTING

BACKGROUND OF THE INVENTION

1. Field of the Invention

This invention relates to video compression methods and apparatus, in particular to video compression methods involving compensation for errors.

2. Description of the Prior Art

A number of digital video compression standards are known, one group, known as MPEG, having been devised by and named after the Motion Picture Experts Group of the International Standards Organisation (ISO). In one form, known as MPEG1, early versions of the draft standard made use of forward prediction between past and current frames of a video signal. In later forms of MPEG1 and another known as MPEG2, the standard additionally makes use of bidirectional prediction which is a combination of forward and backward prediction with the prediction made as an average of the forward and backward predictive frames.

Further background information on MPEG coding can be found, for example, in ISO/IEC 11172-2:1993(E) "Information Technology—Coding of Moving Pictures and Associated Audio for Digital Storage Media at up to about 1.5 Mbit/s".

Tests on picture sequences, for example MPEG picture sequences, have shown that the errors introduced by the quantizer/unquantizer function did not show a uniform distribution. In particular, the distribution of quantization errors is uneven over both spatial and temporal bands. This mean that errors created by some frames are lower than other frames.

SUMMARY OF THE INVENTION

It is an object of the invention to provide a video compression method in which compensation is applied so as to equalize errors over frames.

It is another object of the invention to provide a video compression method in which compensation is achieved by means of temporal weighting, thereby overcoming error distribution reductions in high frequency temporal bands.

It is a further object of the invention to provide a video compression method which is applicable to coding standards such as MPEG1 and MPEG2 systems and derivatives.

According to the invention there is provided a video compression method comprising estimating the reconstruction error in a video encoder dependent on the current video frame, and providing compensation dependent on the estimated reconstruction error so as to equalize the errors over different frames.

In a preferred embodiment of the invention, the compensation is provided by means of temporal weighting, which is applied in the form of temporal bands each associated with specific numbered frames. The frame structure is one described as logarithmic temporal decimation in our copending US patent application No. (ref: S94P5130US00) filed on the same day as the present application. The temporal weighting is applied to overcome error distribution reductions in high frequency temporal bands. Thus compensation is provided so that errors are equal over frames. The method is also applicable to various coding standards including MPEG1 and MPEG2 systems and their derivatives. The errors are such that the method leads to higher compression applied to the frames with highest temporal frequency. The overall result is an improvement in measured S/N ratio of about 1 dB with noticeable picture quality improvement.

The above, and other objects, features and advantages of this invention will be apparent from the following detailed description of illustrative embodiments which is to be read in connection with the accompanying drawings.

BRIEF DESCRIPTION OF THE DRAWINGS

FIG. 3 is a typical quantization matrix for wavelet coding;

FIG. 4 shows quantization error distribution of low and high frequency bands; and FIG. 5 shows the effect of combining masking and error probability effects.

DESCRIPTION OF THE PREFERRED EMBODIMENTS

Figure 1:
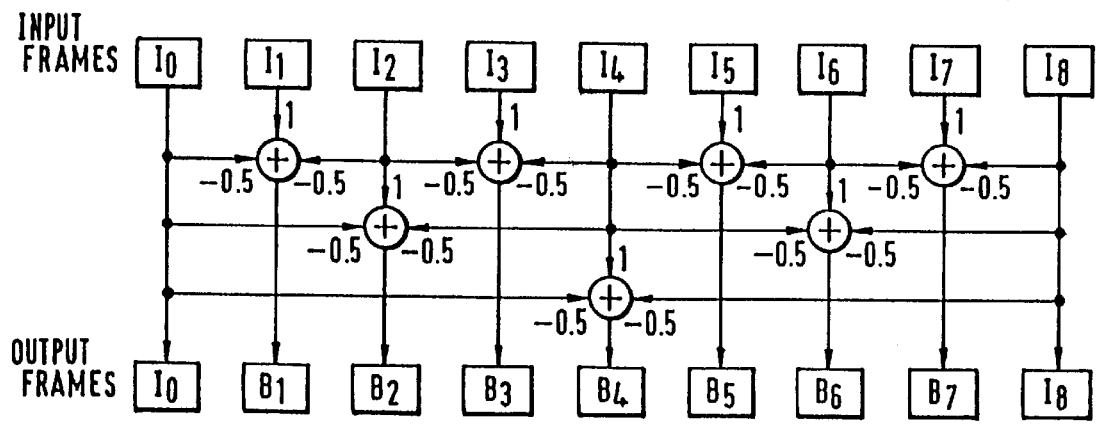
FIG. 1 shows a schematic of a logarithmic temporal decimation structure.
Figure 2:
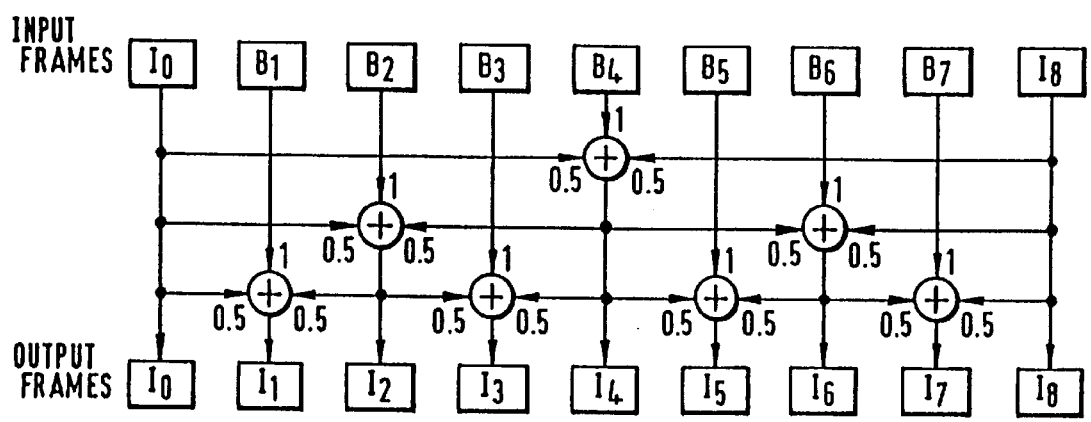
FIG. 2 shows a schematic of a logarithmic temporal interpolation structure which can be used to decode the frame group provided in FIG. 1.

FIGS. 1 and 2 show aspects of a temporal decimation method to effect video compression in which a sequence or group of video frames, otherwise known as a group of pictures (GOP), such as 2, 4, 8, 16, 32 (etc.) frames, is decomposed into one still frame and the remaining frames as difference frames. The method is referred to as logarithmic temporal decimation. The method uses only 'I' and 'B' frames, in which an 'I' frame can be considered to be a normal frame, and a 'B' frame can be considered to be the result of calculating the difference between a current frame and two neighbouring frames on either side. Motion vectors are normally used to assist the creation of 'B' frames. The method creates only 'B' frames as the result of applying a progressive structure in both encoding and decoding. The 'B' frames are quantized by applying selective quantization weighting to predetermined input frames. Decoding can be achieved by applying inverse quantization weighting to the input frames prior to selective summation in order to achieve a constant reconstruction error for each frame even though quantization errors carry over from each reconstruction stage. The method achieves better results than either MPEG1 or MPEG2 coding. Further, use of this form of compression enables the use of a simpler open-loop encoding technique giving better visual results.

The video frame group structure, which can be referred to as a 'B' frame octave structure, will now be described.

The number of frames between the 'I' frames is a power of 2; i.e. 2, 4, 8, 16 etc. A 2-frame sequence is the trivial case as follows:

$I_0$ $B_1$ $I_2$ $B_3$ $I_4$ $B_5$ $I_6$ $B_7$ $I_8$ etc.

Each 'B' frame is predicted from the 'I' frames either side, with or without motion vector compensation. This is an efficient coding technique, but the number of 'I' frames is half the total frame count, thereby limiting coding efficiency.

The next step is to replace every other 'I' frame ($I_2$ and $I_6$) by a corresponding predicted 'B' frame from above as follows:

$I_0$ $B_1$ $B_2$ $B_3$ $I_4$ $B_5$ $B_6$ $B_7$ $I_8$ etc.

Frame $B_2$ has been created by the difference:

$I_2 - (I_0 + I_4)/2$, and frame $B_6$ from the difference:

$I_6 - (I_4 + I_8)/2$.

This gives a 4-frame sequence in two stages. The efficiency is quite good, but there is further advantage to be gained in coding $I_4$ into a 'B' frame using a prediction from frames $I_0$ and $I_8$ as follows:

$$B_4=I_4-(I_0+I_8)/2$$

This leads to the sequence:

$I_0$ $B_1$ $B_2$ $B_3$ $B_4$ $B_5$ $B_6$ $B_7$ $I_8$ etc.

The process can be continued indefinitely with the 'I' frames being spaced by twice the temporal distance at each stage. However, the coding efficiency rapidly approaches an asymptotic limit which is almost reached with a 3-level decimation and further decimation is not normally necessary.

It is also the case that coding delays increase with higher levels of decimation and such delays may introduce operational problems. The memory requirements also increase with higher decimation levels so the incentive is to use as few levels of temporal decimation as possible commensurate with desired picture quality. In most experiments, even for the highest compression ratios, 3 stages of temporal decimation have proven sufficient.

FIG. 1 shows the 3-level, 8-frame logarithmic decimation process in diagrammatic form. Note that although shown as a simple arithmetic process, at each stage, new 'B' frames are created from surrounding 'I' frames with the addition of motion vector compensation in order to minimise the 'B' frame errors.

The motion vectors are related to adjacent frames for the generation of $B_1$, $B_3$, $B_5$ and $B_7$. For the generation of frames $B_2$ and $B_6$ the motion vectors are generated from 2-frames distant. And for the generation of frame $B_4$, the motion vectors are generated from 4-frames distant (i.e., from frame $I_0$ and $I_8$). This means that the motion vector range must increase by a power of 2 for each stage in the logarithmic decimation process.

The decoding process is shown in FIG. 2.

For the 8-frame sequence shown as an example, the decoder must regenerate the frames in a particular sequence for the following reason. Take, for example, frame 1. Its reconstruction depends on having frames $I_0$ and $I_2$. But frame $I_2$ must be reconstructed from frames $I_0$ and $I_4$; and $I_4$ must be reconstructed from frames $I_0$ and $I_8$. The decoder must, therefore, reconstruct the frames in a particular order as follows:

From frames $I_0$ and $I_8$:

$I_4=B_4+(I_0+I_8)/2$

From frames $I_0$, $I_4$ and $I_8$:

$I_2=B_2+(I_0+I_4)/2$ $I_6=B_6+(I_4+I_8)/2$

From frames $I_0$, $I_2$, $I_4$, $I_6$ and $I_8$:

$I_1=B_1+(I_0+I_2)/2$ $I_3=B_1+(I_2+I_4)/2$ $I_5=B_1+(I_4+I_6)/2$ $I_7=B_1+(I_6+I_8)/2$

Investigations have been carried out so as to establish the frequency response threshold of the Human Visual System (HVS). This was achieved by setting a horizontal frequency on a monitor and increasing the signal level until it could just be seen. Three people took part in the tests and established a reasonably accurate model for the threshold sensitivity giving rise to a set of equations for the luminance and chrominance responses as follows:

$$Y(\omega)=(1.1-e^{-(1.6*\omega)}(e^{-(0.4*\omega)}+0.33*e^{-(0.33*0.4*\omega)})$$

$$Cb(\omega)=1.7*(1.1-e^{-(1.6*\omega)})*e^{-(0.6*\omega)}$$

$$Cr(\omega)=1.35*(1.1-e^{-(1.6*\omega)})*e^{-(0.4*\omega)}$$

where '$\omega$' is 'cycles per degree' of visual acuity calibrated such that 20 c/deg is equivalent to 384 cpw or 288 cph at 4H viewing distance.

This model was used for most of the Wavelet and DCT coding work for intraframe and inter-frame coding and led to a quantization matrix for a 3-stage Wavelet coder typically set for a 4 H viewing height as shown in FIG. 3. However, it was evident from looking at certain sequences that the HVS response to dynamic errors was considerably different to the static response.

The aim of this work was to explore the possibilities of improving the visual performance of compression systems through a better understanding of the mechanics of visual perception. This work extended to cover two other new aspects; namely, exploring the visual masking effect and taking account of error probability distributions.

In the course of studying human awareness of error artifacts, it was noticed that that there are other aspects concerned with the distribution of errors. Experimental software was written to check the distribution quantization errors between the different wavelet bands in both the spatial and temporal sense. The software simply found the mean square error created by the quantization process. One might assume that this would be a constant for all bands, but this is not the case. The quantization mean square error (mse) is calculated from:

$$mse=\sqrt{(\Sigma(S-S_q)^2)}$$

where S is the input value and

Sq is the reconstructed value after the quantization/unquantization process.

The basis of the human visual system measurements has been that, for a system using Wavelet coding, the reconstruction errors have been constant for each wavelet band. Results taken from compressing the first 8 frames of a test sequence are shown in Table 1.

TABLE 1

| Quantisation Error Distribution Across Spatial and Temporal Bands | | | | | | | | | | |
|---|---|---|---|---|---|---|---|---|---|---|
| Wavelet Band: | 0 | 1 | 2 | 3 | 4 | 5 | 6 | 7 | 8 | 9 |
| Y Errors | | | | | | | | | | |
| Band 0 | 1.00 | 0.97 | 0.95 | 0.96 | 0.92 | 0.93 | 0.85 | 0.77 | 0.77 | 0.55 |
| Band 1 | 0.90 | 0.84 | 0.90 | 0.81 | 0.86 | 0.88 | 0.79 | 0.75 | 0.75 | 0.50 |
| Band 2 | 0.83 | 0.80 | 0.79 | 0.75 | 0.81 | 0.81 | 0.70 | 0.69 | 0.69 | 0.43 |
| Band 3 | 0.84 | 0.81 | 0.79 | 0.76 | 0.82 | 0.80 | 0.71 | 0.72 | 0.68 | 0.46 |
| Cb Errors | | | | | | | | | | |
| Band 0 | 1.05 | 0.93 | 0.93 | 0.86 | 0.79 | 0.83 | 0.70 | 0.58 | 0.59 | 0.20 |
| Band 1 | 0.79 | 0.68 | 0.70 | 0.66 | 0.73 | 0.70 | 0.53 | 0.48 | 0.52 | 0.18 |

TABLE 1-continued

Quantisation Error Distribution Across Spatial and Temporal Bands

| Wavelet Band: | 0 | 1 | 2 | 3 | 4 | 5 | 6 | 7 | 8 | 9 |
|---|---|---|---|---|---|---|---|---|---|---|
| Band 2 | 0.83 | 0.72 | 0.73 | 0.68 | 0.72 | 0.70 | 0.54 | 0.50 | 0.51 | 0.19 |
| Band 3 | 0.80 | 0.68 | 0.71 | 0.65 | 0.64 | 0.67 | 0.53 | 0.47 | 0.50 | 0.18 |
| Cr Errors | | | | | | | | | | |
| Band 0 | 0.98 | 0.90 | 0.92 | 0.84 | 0.80 | 0.83 | 0.72 | 0.65 | 0.67 | 0.35 |
| Band 1 | 0.83 | 0.68 | 0.74 | 0.64 | 0.71 | 0.73 | 0.56 | 0.60 | 0.61 | 0.32 |
| Band 2 | 0.83 | 0.69 | 0.77 | 0.66 | 0.71 | 0.72 | 0.56 | 0.60 | 0.59 | 0.32 |
| Band 3 | 0.81 | 0.69 | 0.75 | 0.65 | 0.65 | 0.69 | 0.54 | 0.55 | 0.56 | 0.31 |

The temporal bands are divided into four tables as per their temporal frequency components, i.e., Temporal Band 0 consists of frame 0 (and frame 8), Band 1 consists of frame 4,
Band 2 consists of frames 2 and 6, and
Band 3 consists of frames 1, 3, 5 and 7.

There is a general trend towards the higher spatial and temporal bands producing lower error levels. It is believed, though not confirmed, that the higher frequency bands have a higher concentration of signals around zero; since these are rounded to zero, the error can be small since the original signal was small. This leads to the argument that where signals in one band lie very close to zero and produce smaller errors than those of other bands when normally quantized, then the data in that band can be discarded. This provides a justification to discard frequency bands in the compression process. Without this concept, another argument exists which suggests that there is no reason why any band should be discarded. This second argument can now be dismissed with this new understanding.

A simple representation of the cause of reducing error values is shown in FIG. 4.

In FIG. 4, the general distributions of signal levels for a low and high spatial frequency band are shown. The quantization levels are shown as lightly shaded lines. The process of quantization leads to errors in the range $-\epsilon/2$ to $+\epsilon/2$ as shown. Now the low frequency band has a wide distribution of signal levels and so the errors introduced by quantization are evenly spread across the error range. However, the high frequency signal has most of its distribution around zero, very few signals exceed +/− 1 quanta level, and so the error distribution is tilted towards the zero axis. Therefore the errors created by the high frequency band will be, on average, smaller than the errors created in the low frequency band.

There are three factors to consider with spatial processing:
 i) the dynamic presentation of errors causing modifications to the HVS model,
 ii) the masking effect of errors when surrounded by other frequency components and
 iii) the reduction of errors in high spatial frequency bands.

In the first case, the HVS model had already compensated for this factor, and no further benefit was available.

In the second and third cases, consider the HVS weighting modifications as shown in FIG. 5, which shows the effect of combining the masking and error probability effects.

Of course, the masking effect is dependent on the signal levels in localised areas, and the error probability distribution is very dependent on the overall quantization level. However, the point of FIG. 5 is to demonstrate that the two effects tend to cancel out.

These effects, in combination with the general observation that changes in the spatial weighting characteristic tend to have subtle effects on overall picture quality confirms results which demonstrate that the spatial weighting factor used in all work over a long period of time is adequate and unlikely to be easily bettered.

Table 1 also shows that there is a change in the error distribution between temporal bands 0 to 3 in that the higher band has lower error values in the same way as occurred with the spatial distribution. Compensation can readily be applied to the temporal bands to equalize this distribution by lowering the quantizing levels for the higher temporal bands thereby increasing the quantizing error. This temporal weighting also has the crucial effect of reducing the data in these higher bands.

Experiments were conducted using a test sequence with five levels of temporal weighting based on the square root term:

$Y(t) = \sqrt{(t/n)}$ where 't' is the temporal band number 0–3

The definition of the temporal weighting terms are as follows:

| | | |
|---|---|---|
| Light (L): | $Y(t) = \sqrt{(t/8)}$ | $C(t) = \sqrt{(t/4)}$ |
| Medium (M): | $Y(t) = \sqrt{(t/6)}$ | $C(t) = \sqrt{(t/3)}$ |
| Light-Heavy (LH): | $Y(t) = \sqrt{(t/4)}$ | $C(t) = \sqrt{(t/2)}$ |
| Heavy (H): | $Y(t) = \sqrt{(t/3)}$ | $C(t) = \sqrt{(t/1.5)}$ |
| Very Heavy (VH): | $Y(t) = \sqrt{(t/2)}$ | $C(t) = \sqrt{t}$ |

The results for the 24 frame sequence are given in Table 2 for each temporal weighting term. The table shows the benefit of applying a temporal weighting factor to the sequences with each increase in weighting (i.e. more quantization errors in the higher temporal bands) results in an increase in average S/N ratio. However, it is to be noted that, with the highest temporal weighting, the luminance S/N ratio becomes significantly worse for the higher temporal bands. This produces artifacts in viewing tests where some pictures are obviously more heavily quantized than others resulting in a beat pattern. This is to be avoided since it can produce unsatisfactory viewing. Note that these observations hold for luminance signals, but for chrominance no such change in S/N performance is evident. Note also that the error distribution of particularly the B-Y component changes more rapidly with band number compared with the luminance component. Since the contribution of chrominance data to the overall sum is relatively small, it can be treated less carefully than the luminance data.

TABLE 2

Temporal Weightings Applied to the Mobile and Calendar Sequence

| Sequence: | | Frames 0 ~ 8 | | | | | Frames 8 ~ 16 | | | | | Frames 16 ~ 24 | | | | |
|---|---|---|---|---|---|---|---|---|---|---|---|---|---|---|---|---|
| | Band | L | M | LG | H | VH | L | M | LH | H | VH | L | M | LH | H | VH |
| Y | 0 | 27.63 | 27.97 | 28.70 | 29.29 | 30.41 | 27.60 | 27.95 | 28.62 | 29.22 | 30.23 | 28.36 | 28.69 | 29.35 | 29.94 | 30.99 |
| S/N | 1 | 27.67 | 27.84 | 28.24 | 28.51 | 28.89 | 27.94 | 28.16 | 28.55 | 28.87 | 29.25 | 28.93 | 29.13 | 29.51 | 29.83 | 30.31 |
| | 2 | 28.38 | 28.54 | 28.88 | 29.08 | 29.37 | 27.72 | 27.77 | 27.97 | 28.08 | 28.03 | 28.64 | 28.71 | 28.86 | 28.96 | 28.98 |
| | 3 | 27.88 | 27.92 | 28.02 | 27.99 | 27.87 | 28.18 | 28.26 | 28.39 | 28.43 | 28.33 | 29.18 | 29.24 | 29.40 | 29.50 | 29.53 |
| | Σ | 27.94 | 28.06 | 28.33 | 28.46 | 28.60 | 27.95 | 28.08 | 28.31 | 28.46 | 28.52 | 28.90 | 29.02 | 29.26 | 29.44 | 29.62 |
| C | 0 | 29.36 | 29.68 | 30.35 | 30.89 | 31.86 | 29.30 | 29.63 | 30.25 | 30.85 | 31.70 | 30.00 | 30.32 | 30.92 | 31.46 | 32.39 |
| S/N | 1 | 30.51 | 30.69 | 31.14 | 31.43 | 31.90 | 30.02 | 30.17 | 30.52 | 30.73 | 31.02 | 30.87 | 31.09 | 31.43 | 31.70 | 32.12 |
| | 2 | 30.16 | 30.28 | 30.61 | 30.81 | 31.23 | 30.33 | 30.50 | 30.84 | 31.08 | 31.47 | 30.81 | 31.00 | 31.35 | 31.61 | 32.10 |
| | 3 | 30.48 | 30.64 | 31.07 | 31.38 | 31.92 | 30.41 | 30.60 | 30.96 | 31.47 | 31.72 | 30.98 | 31.16 | 31.51 | 31.80 | 32.29 |
| | Σ | 30.24 | 30.42 | 30.87 | 31.17 | 31.73 | 30.18 | 30.38 | 30.78 | 31.10 | 31.56 | 30.79 | 31.00 | 31.38 | 31.70 | 32.23 |
| bpp | Y | .3453 | .3427 | .3426 | .3381 | .3332 | .3468 | .3443 | .3440 | .3432 | .3358 | .3427 | .3384 | .3377 | .3360 | .3318 |
| | C | .1023 | .1029 | .1086 | .1129 | .1251 | .1010 | .1017 | .1064 | .1115 | .1212 | .1083 | .1081 | .1121 | .1185 | .1302 |
| | Σ | .3964 | .3941 | .3969 | .3945 | .3957 | .3973 | .3951 | .3972 | .3989 | .3964 | .3968 | .3924 | .3937 | .3952 | .3969 |
| | Q | 86 | 91 | 102 | 112 | 132 | 85 | 90 | 100 | 110 | 128 | 95 | 100 | 111 | ? | ? |

The above figures were based on the conventional 'closed loop' encoder, a technique which ensures that errors do not propagate in the decoder. Thus errors are contained within each individual frame. A technique called 'open-loop' encoding controls the level of error propagation producing better results than the conventional method. The technique is described in more detail in our co-pending U.S. patent application No. (ref: S94P5130US00) filed on the same date. Both closed loop and open loop decoders are described therein.

The technique of temporal weighting can easily be as applied in the open-loop encoder with equally beneficial results. However, the open-loop coding method introduces its own weighting so the two weighting types must be combined. This is a relatively easy task which can be achieved with the following segment of code used as part of the quantization matrix generator:

```
t_scale[0]=1.0; t_scale[8]=1.0;      // reference values
wt=pow(2.0,t_weighting/4.0);          // first temporal band weighting
t_scale[4]=(wt*wt)-0.5;
wt=pow(2.0,t_weighting*2.0/4.0);   // second temporal band weighting
t_scale[2]=(wt*wt)-(10.0/16.0)-(0.25*t_scale[4]);
t_scale[6]=t_scale[2];
wt=pow(2.0,t_weighting*3.0/4.0);   // third temporal band weighting
t_scale[1]=(wt*wt)-(50.0/64.0)-(0.25*t_scale[2])-
(0.0625*t_scale[4]);
t_scale[7]=t_scale[1];
t_scale[3]=(wt*wt)-(34.0/64.0)-(0.25*t_scale[2])-
(9.0/16.0*t_scale[4]);
t_scale[5]=t_scale[3];
for(t=0; T<9; t++)    y_weight[t]=sqrt(1.0/t_scale[t]);
```

The variable array t_scale[ ] provides temporary values prior to computing values for each respective frame in the array $y_{13}$ weight[ ] and t_weighting is a parameter entered from the command line. A typical value for the t_weighting coefficient would be 1.0 but can vary typically from 0.25 to 1.5 depending on the picture sequence.

The target window of S/N values was set to around 1 dB in order to ensure that However, the nature of errors in the open-loop encoding method is different and the range of S/N values permissible seems to be larger though no work has been done to verify the limit. A S/N range of up to 3 dB still produces acceptable results with the pen loop coding method.

Non-linear quantization (NLQ) has been used for several years to varying degrees. The most acceptable seems to be the following type:

| Input (after quantization): | −4 | −3 | −2 | −1 | 0 | 1 | 2 | 3 | 4 |
| After NLQ: | | −3 | −2 | −1 | 0 | 0 | 0 | 1 | 2 | 3 |
| Expansion of NLQ: | −4 | −3 | −2 | 0 | 0 | 0 | 2 | 3 | 4 |

This process of NLQ, by being applied after the quantization process, ensures that the errors introduced by the NLQ process are HVS weighted. Nevertheless, because the dc band of the 'I' frame is the only part of the coded picture not to be centered around zero, this one band is not subject to NLQ.

Various tests carried out for various compression ratios from 4:1 to 160:1 show that the reconstruction error between NLQ encoded signals and linearly quantized signals is very similar. Visually, however, linear quantization reconstructs a slightly clearer signal but has more noise, whereas NLQ encoded pictures have a slightly 'softer' appearance and a lower noise level.

The addition or exclusion of the NLQ process is very simple and can, if so desired, be selected at transmission and reception. One aspect of NLQ not studied is its ability to encode noisy source signals more effectively. The strong feature of NLQ is that is removes spurious +1 and −1 values from the ac signals and thereby improves the entropy coding. It was anticipated that the application of more accurate spatial and temporal quantization processing would remove the need for NLQ; however, this has not proved the case. There is no evidence to suspect that the HVS has any aspect which encourages the adoption of NLQ; indeed, the response of the eye seems to be very linear for low-level artifacts. However, the connection with better entropy coding is a very relevant point and may be the reason for its benefit to the overall coding system.

The studies described above have been undertaken in order to attempt a greater understanding of the human visual perception of the errors created by a video compression system. There are three effects which are apparent in spatial images, namely:

i) The difference in the HVS response to static and dynamic errors. Previous tests to establish the threshold of error visibility had relied on testers looking at displayed images for several seconds thus allowing the HVS to build up a persistence effect. This is not a realistic way to assess image errors, since even for intra-frame coding errors occur for only one frame (or field). New tests were performed which confirmed the static model used so far, but also created a dynamic model for error visibility. This, somewhat remarkably, showed a response which was close to the static response, but viewed at half the viewing distance from the monitor. For compression systems of 2 Mbps and above the error artifacts are sufficiently small and as a result most observers tend to view test pictures much closer than the designated distance thereby inadvertently matching the measured dynamic HVS response.

ii) The HVS shows a masking effect in which errors can be masked by a high level of background signal. The masking effect has been measured; however, the results are variable. On the other hand, a trend is clear in that the masking effect is dependant on the HVS frequency response. The masking effect appears to be a direct function of the HVS threshold response, i.e. there is little effect at dc levels; the maximum effect is at very low frequencies progressively reducing to virtually nothing at the highest spatial frequencies. In theory, there should be some coding advantage in using this model to allow higher quantization errors in 'busy' picture areas; however, no benefit has so far been found in practice after several software programs were developed to test this effect.

iii) The error distribution varies considerably between spatial frequency bands thus allowing the possibility of quantizing higher spatial bands more heavily and reducing the overall data rate. However, the effect is relatively small and tends to counter the masking effect noted above, thereby practically removing any benefit.

The last effect is also seen in the temporal decimation process. Unlike the spatial process, results of modifying the compression levels at the frame level have produced a significant improvement in performance, resulting in over 1–2 dB S/N improvement and an equivalent improvement in visual performance. The temporal weighting factor applied can be set to too large a value resulting in better S/N values for the GOP sequence, but noticeable modulation of noise over the GOP sequence. A careful balance must be made between S/N and picture quality improvements.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A video compression method comprising the steps of:
    encoding a video frame group using a pair of I-frames at each extremity of said video frame group, together with one or more motion compensated B-frames created by logarithmic temporal decimation;
    predetermining relative weighting values for compensation of each of a plurality of video frames within said video frame group;
    estimating the reconstruction error in a video decoder generated when decoding each of said B-frames of the current video frame, said reconstruciton error for each B-frame being defendant on a decoding error associated therewith, as well as decoding errors associated with surrounding B-frames; and
    providing compensation in accordance with said predetermined relative weighting values and dependent on said estimated reconstruction error so as to equalize said errors over different frames and mitigate accrued reconstruction errors, wherein said compensation is provided by means of temporal weighting.

2. The method according to claim 1, wherein in each video frame group, all of the frames other than the 'I' frame are 'B' frames.

3. The method according to claim 2, wherein each encoded video frame group includes a range of a power of 2 frames.

4. The method according to claim 1, wherein an incoming video frame group includes a number of frames, and the temporal weighting is applied in the form of temporal bands each associated with specific numbered frames, each temporal band including specific numbered frames defined at the same level of a logarithmic temporal decimation encoding procedure.

5. The method according to claim 1, further comprising the step of increasing a weighting factor of said means of temporal weighting resulting in an increase in the average S/N ratio.

6. The method according to claim 1, further comprising the step of applying temporal weighting to temporal bands to equalize said errors by lowering quantizing levels for higher temporal bands, thereby increasing quantizing errors of the higher temporal bands.

7. The method according to claim 1, further comprising the step of applying said means of temporal weighting in an open loop encoder.

8. The method according to claim 7, further comprising the step of combining said means of temporal weighting with a means of weighting of said open loop encoder to equalize said errors.

* * * * *